INVENTORS.
William B. Clarke
Howard L. Hunter
Frank Santucci
BY Well, Mackey + Burden
THEIR ATTORNEYS Jan. 29, 1957　　W. B. CLARKE ET AL　　2,779,490
FEEDING APPARATUS
Filed Jan. 31, 1955　　6 Sheets-Sheet 2

INVENTORS.
William B. Clarke
Howard L. Hunter
Frank Santucci
BY
THEIR ATTORNEYS

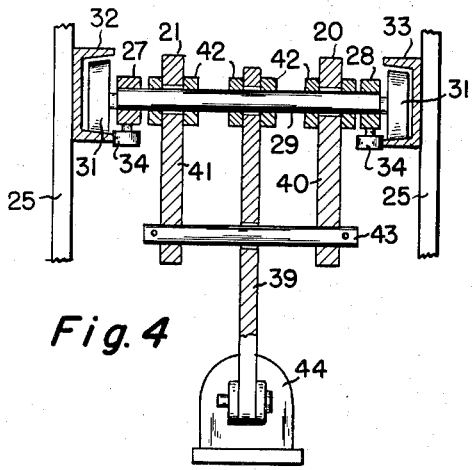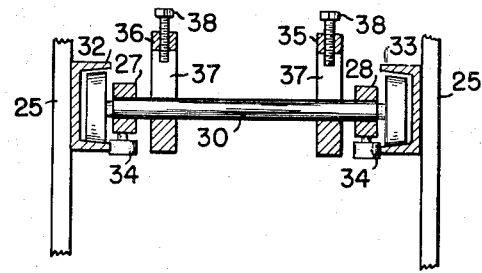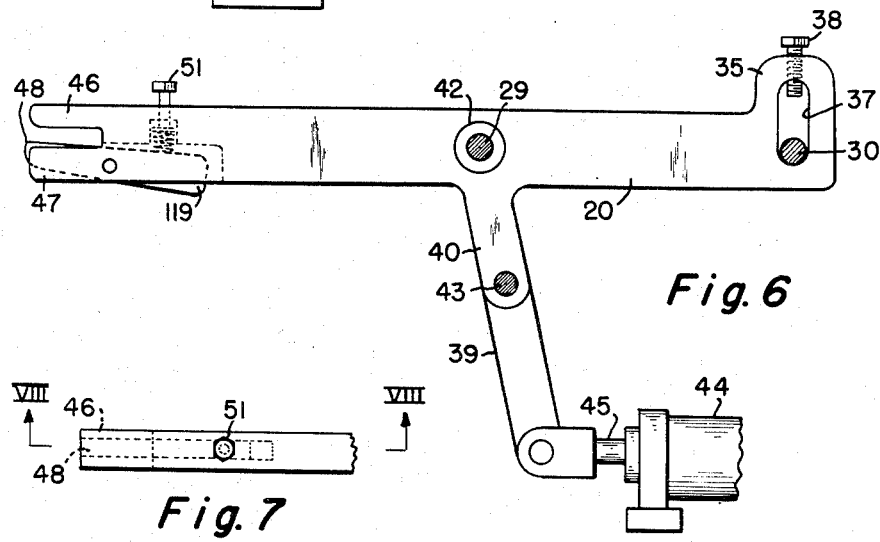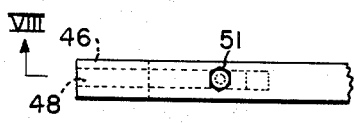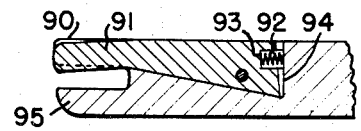

INVENTORS.
William B. Clarke
Howard L. Hunter
Frank Santucci

BY

*Weft, Mackey + Burden*

THEIR ATTORNEYS

INVENTORS.
William B. Clarke
Howard L. Hunter
Frank Santucci

BY *Welt, Mackey & Burden*

THEIR ATTORNEYS

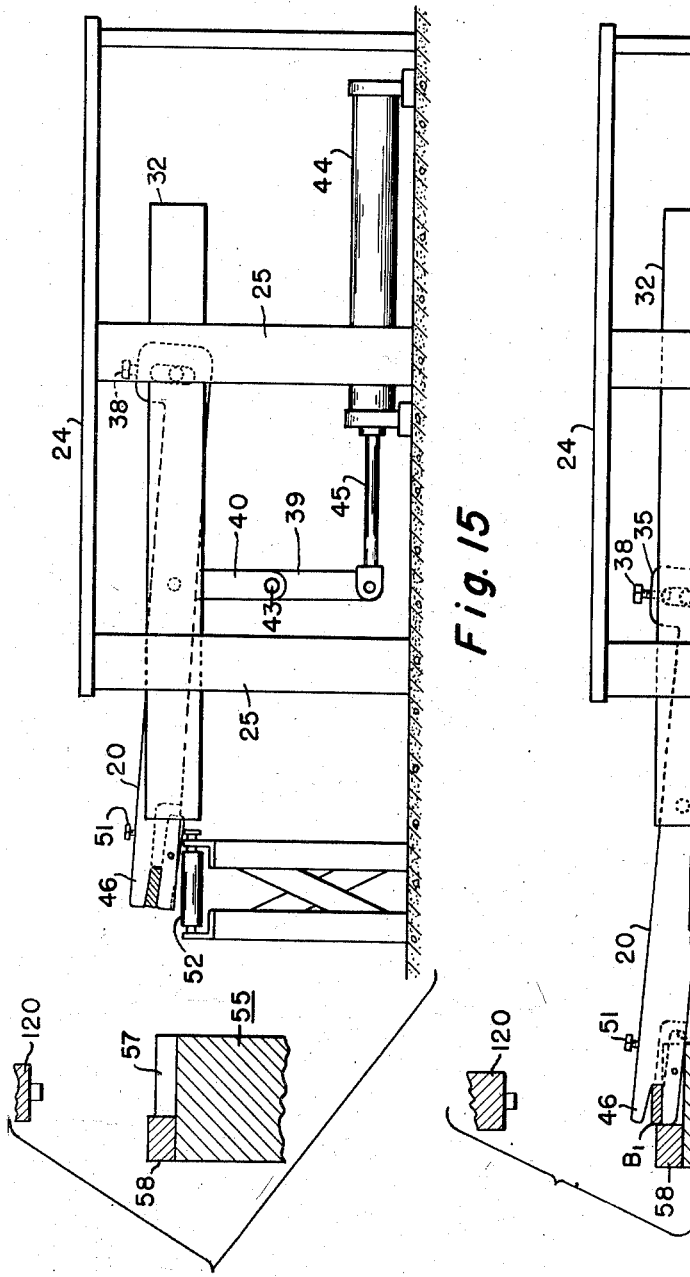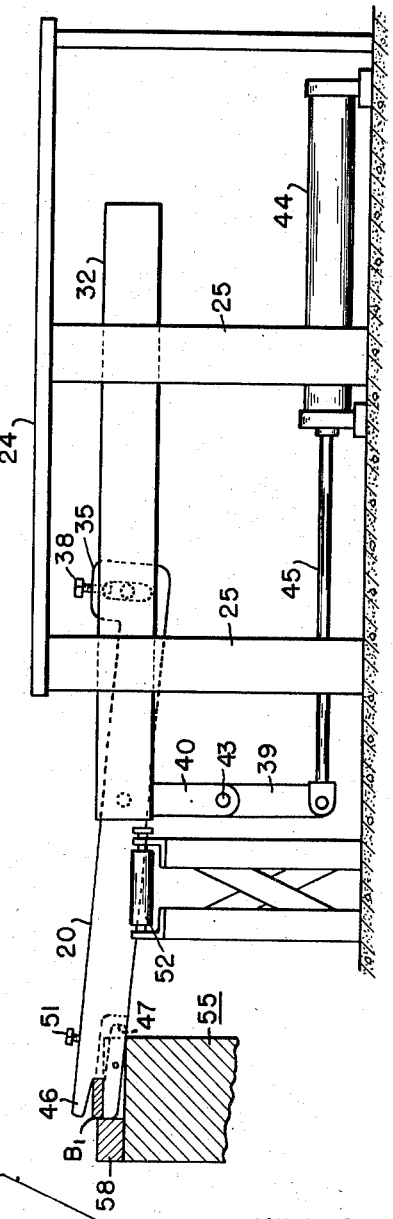

United States Patent Office

2,779,490
Patented Jan. 29, 1957

2,779,490

FEEDING APPARATUS

William B. Clarke, Sewickley, Howard L. Hunter, McKees Rocks, and Frank Santucci, Coraopolis, Pa., assignors to Rockwell Spring and Axle Company Coraopolis, Pa., a corporation of Pennsylvania Application January 31, 1955, Serial No. 485,112

17 Claims. (Cl. 214—91)

This invention relates to feeding apparatus and, more particularly, to apparatus designed automatically to feed a workpiece or similar article to a work station and then retract the workpiece and release it from the apparatus.

In processing articles such as metal bars or similar stock, it often is necessary to handle only a few at a time, especially when positioning one or more of the bars for a subsequent operation thereon. As an instance, bracket bars are heat treated and then punched or otherwise deformed in a die press one at a time. Accordingly, it is necessary to transfer the bars singly from the heat treating furnace to the die press, remove the bar from the press, and advance alone to other apparatus, preferably conveying means to carry the bar to still another station. Heretofore, such processing of bars one at a time has been largely dependent on manual labor. In addition to the inherent dangers to operating personnel in handling very hot bars, the work is repetitious and quite fatiguing.

We have developed automatic apparatus to pass a workpiece such as a metal bar through the indicated steps. While our invention is disclosed in connection with feeding a bar to a die press, it will be apparent that our invention is generally adapted to receive a workpiece from an initial station, feed the workpiece to a work station, retract the workpiece therefrom, and then release the workpiece from the apparatus and preferably also advance it to another station.

The accompanying drawings illustrate a presently preferred embodiment wherein.

Figure 1:
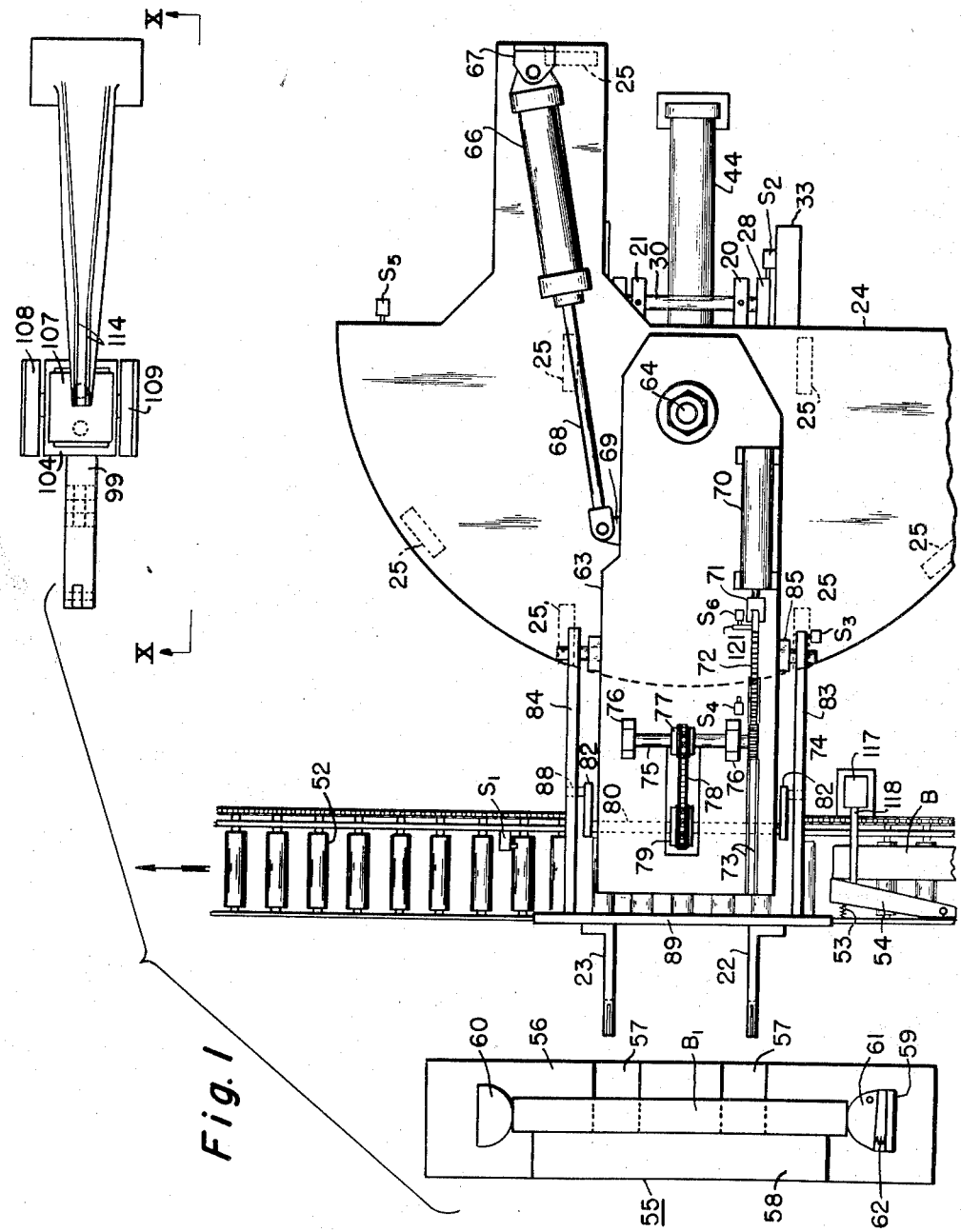
Figure 1 is a plan view of our feeding apparatus.
Figure 2:
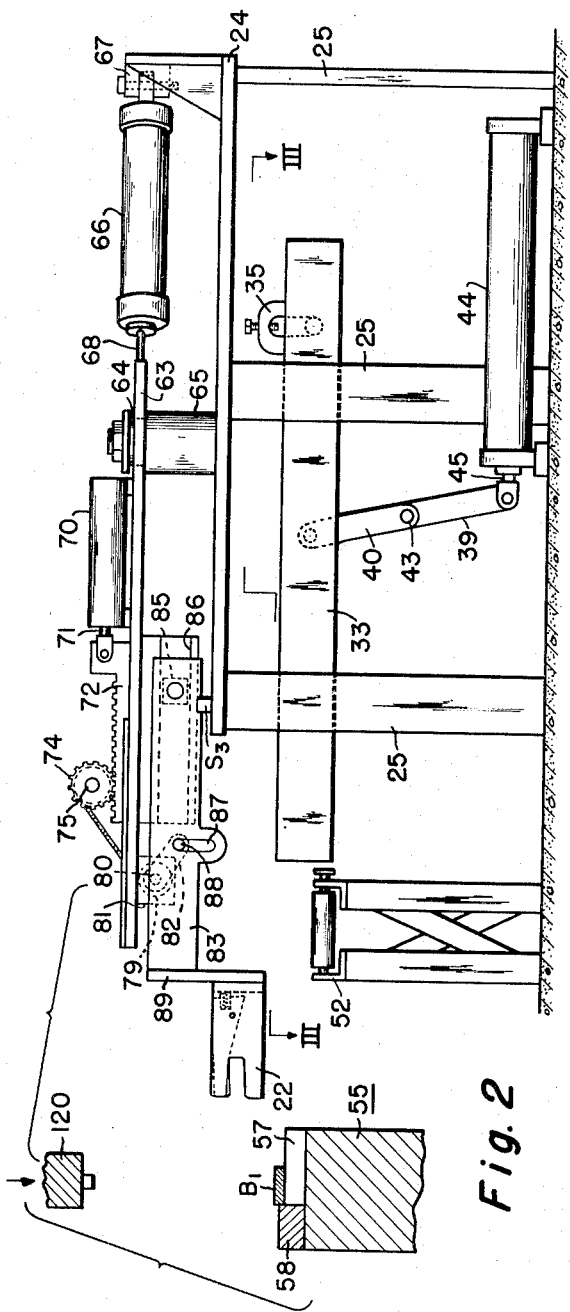
Figure 2 is a side view of Figure 1 and includes a die press in vertical section illustrating a bed thereof which is adapted to receive arms from our apparatus.
Figure 3:
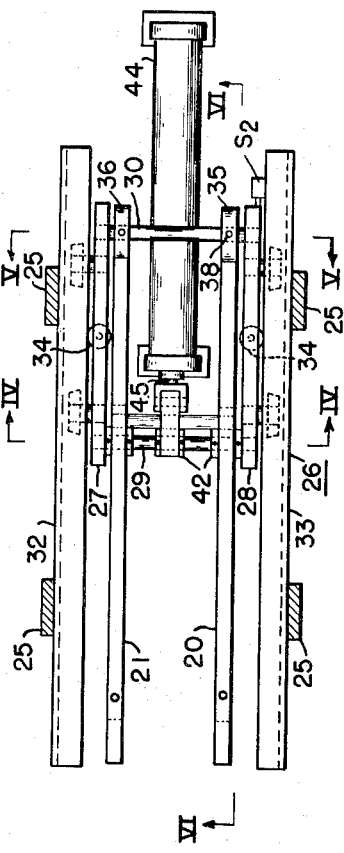
Figure 3 is an off-set section of Figure 2 on the line III—III.
Figure 10:
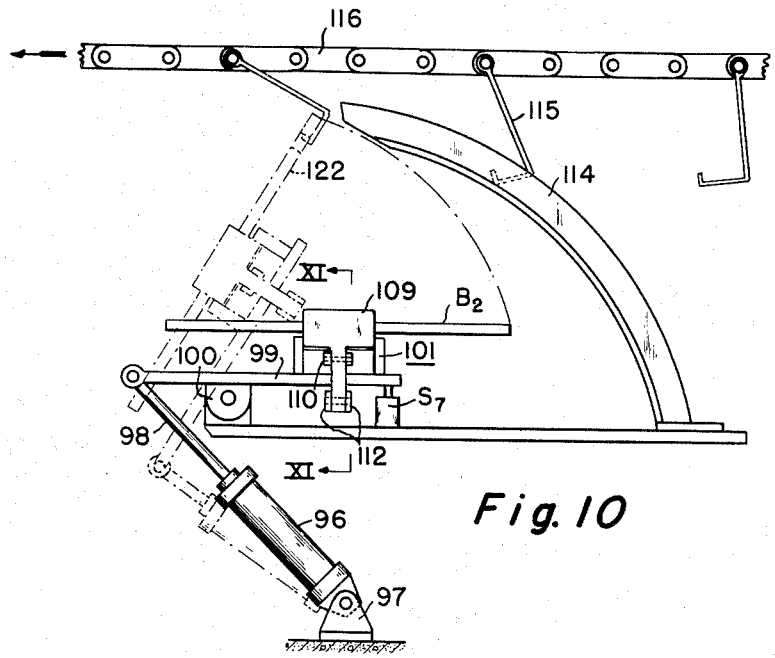
Figure 13:
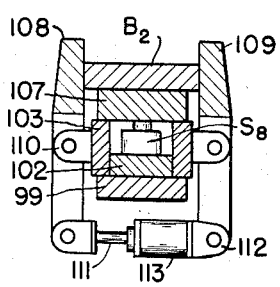
Figure 12:
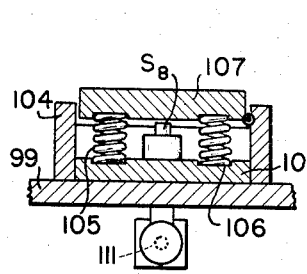
Figure 11:
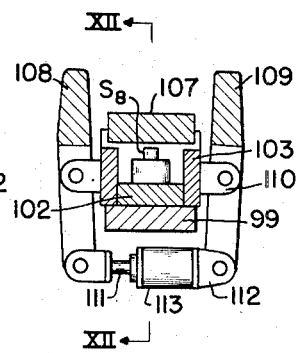
Figure 17:
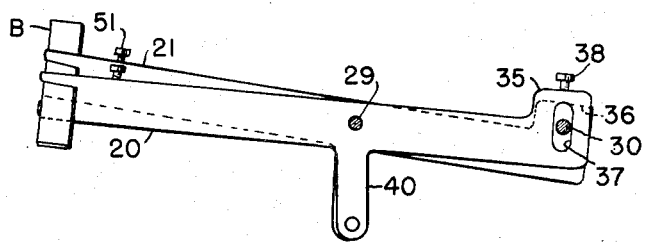
Figure 14:
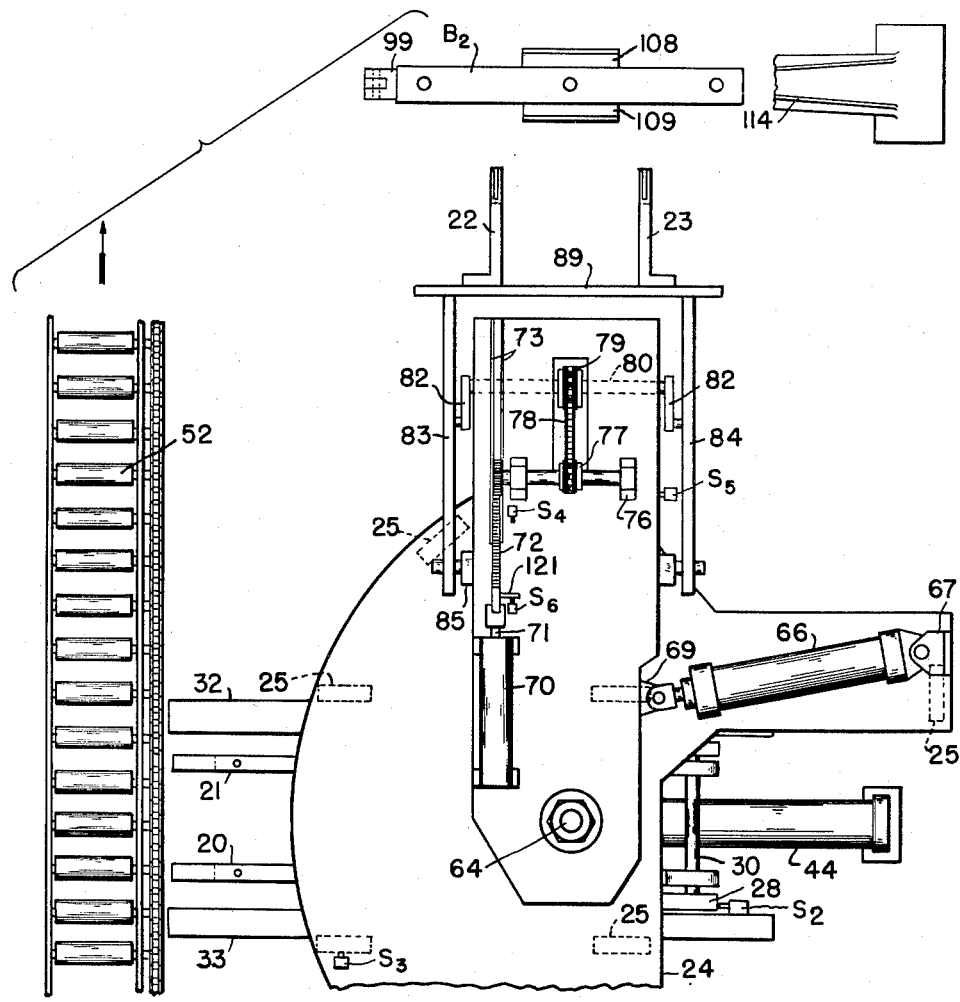
Figure 18:
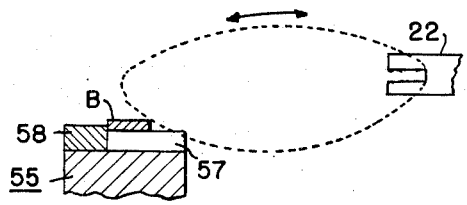

Figures 4, 5, and 6 are sections of Figure 3 on the lines IV—IV, V—V, and VI—VI, respectively;

Figure 7 is a plan view of the leading end of one of the carriage arms;

Figure 8 is a section of Figure 7 on the line VIII—VIII;

Figure 9 is a section similar to that of Figure 8 of the leading end of one of the arms stationed above the carriage arms;

Figure 10 is a view taken on the plane of the line X—X in Figure 1 and illustrates apparatus for transferring a workpiece to a conveyor;

Figure 11 is a section of Figure 10 on the line XI—XI;

Figure 12 is a section of Figure 11 on the line XII;

Figure 13 is a section similar to that of Figure 11 and shows the clamps holding a workpiece;

Figure 14 is a plan view similar to Figure 1 and illustrates the upper arms in a pivoted position and adjacent the apparatus of Figure 10;

Figure 15 is a view similar to that of Figure 2 and shows the carriage arms passing an initial station to engage a workpiece;

Figure 16 is a view similar to Figure 15 and illustrates the carriage arms depositing a workpiece at a die press bed;

Figure 17 is a schematic illustration of the lower arms being pivoted unequally to present a workpiece in an oblique position; and Figure 18 is a schematic illustration of the path of travel of the jaws of the upper arms.

*Structure*

Referring to the drawings, our apparatus includes delivery arms 20 and 21 supported below and delivery arms 22 and 23 supported above a table 24 suitably elevated by posts 25. Considering the lower arms first, a carriage generally shown at 26 (Figure 3, 4, 5, and 6) includes two side bars 27 and 28 joined by fixed rods 29 and 30. Rollers 31 horizontally journaled in the side bars ride in channels 32 and 33, and rollers 34 vertically journaled in the side bars ride the lower flanges of the channels to prevent excessive lateral movement of the carriage. The arms 20 and 21 loosely pivot about the rod 29 and have ear portions 35 and 36 respectively provided with slots 37 to receive the rod 30. Capscrews 38 are threaded through the tops of the ear portions and may be adjustably positioned within the slots 37. A center bar 39 also is free to pivot on rod 29 and extends below lugs 40 and 41 depending from and integral with the arms 20 and 21 respectively. Fixed collars 42 hold the arms and bar 39 in position on the rod 29. A loosely fitting pin 43 passes through oversize openings in a medial portion of the bar 39 and in the lower extremities of the lugs 40 and 41. A double-acting air cylinder 44 has its piston rod 45 pivotally connected to the lower end of bar 39.

The leading end of each of the arms 20 and 21 (Figures 7 and 8) has an upper jaw 46, a forked lower jaw 47, and a jaw 48 which is pivoted between the forked jaw. A spring 49 housed in a recess 50 in the upper jaw urges jaw 48 toward the upper jaw 46. A cap screw 51 adjusts the tension of the spring 49.

In the embodiment shown, a conventional roller table 52, representing an initial station, is used to advance a workpiece such as a bar B (Figure 1) before the arms 20 and 21. A spring 53 normally urges a stop lever 54 in front of the approaching bar until the feeding apparatus is prepared for it, as hereinafter described. A die press generally shown at 55, representing a work station, is placed beyond the roller table. The die press is conventional except that, preferably, the bed 56 has slots 57 to receive the arms 20 through 23. Also, it is preferable to use a rear block 58 and end gauges 59 and 60 to suitably position a bar B₁ on the bed. To this end, gauge 59 has a pivoted arm 61 to allow entry of the bar and a spring 62 to urge the arm against the adjacent end of bar B₁.

Considering now the structure attendant the upper arms 22 and 23, a plate 63 is fixed to a stub shaft 64 pivotally carried in a fixed collar 65. A double-acting air cylinder 66 pivotally joined to brackets 67 carried by the table 24 has its piston rod 68 similarly joined to a lug 69 of the plate 63. Another double-acting air cylinder 70 has its piston rod 71 joined to a rack 72 which travels between guide ways 73. The rack 72 engages a pinion 74 carried by a shaft 75 suitably journaled in bearings 76. Shaft 75 has a gear 77 connected by chain 78 through an opening in the plate 63 to a gear 79 fixed to a second shaft 80 suitably journaled in bearings 81 on the underside of plate 63. Shaft 80 terminates at each end in a crank 82. Levers 83 and 84 are pivotally joined to riders 85 free to travel in retaining guide ways 86 which depend from plate 63. Each lever has a slot 87 to receive a crank pin 88 of the adjacent crank 82. A cross plate 89 joins the forward ends of levers 83 and 84 and also supports the arms 22 and 23. In the jaws of these arms, (Figure 9) the upper jaw 90 is forked to receive a pivoted jaw 91. A spring 92 housed in a recess 93 within the pivoted jaw acts against a shoulder 94 to urge jaw 91 toward a lower fixed jaw 95.

As illustrated in Figures 10 through 13, our apparatus also includes means for receiving a workpiece from the upper arms 22 and 23 and transferring it to a delivery station where, for example, it may be taken by a conveyor. A double-acting air cylinder 96 pivotally supported by brackets 97 has its piston rod 98 pivotally joined to a lever 99. The lever, mounted to pivot on lugs 100, carries a holder generally shown at 101. The holder includes a bottom 102 enclosed by side walls 103 and end walls 104. Springs 105 carried in recesses 106 in the bottom 102 normally support a plate 107 hinged at one end above a limit switch as shown in Figure 12. Clamps 108 and 109 are pivoted at a medial portion to lugs 110 projecting from the side walls 103 and pivotally joined at their lower ends to a piston rod 111 and brackets 112, respectively, of a micro-air cylinder 113. Converging guide walls 114 position hooks 115 of a conveyor 116 over the holder 101.

Operation

Arbitrarily beginning the cycle of operation when the plate 63 is rotated to the side delivery position as indicated in Figure 14, a solenoid 117 may be manually energized, or energized by the completion of a preceding step as hereinafter described, to push an armature 118 outwardly and force the lever stop 54 away from the bar B. The operation thereafter may be completely controlled by limit switches. The driven roller table 52 carries the bar forwardly until it strikes a combined stop and limit switch $S_1$ which operates the double-acting cylinder 44. Since the force of the piston rod of this cylinder is applied to the lugs 40 and 41 of arms 20 and 21, respectively, through the bar 39 and pin 43, the first movement of the arms is primarily that of pivoting on the rod 29 until the cap screws 38 reach rod 30. Thereafter, with increasing momentum, the carriage 26 moves forwardly toward the die press 55. The resultant action is that the jaws of arms 20 and 21 engage the bar B when they pass over the roller table 52. More particularly, the position of the roller table and the moving arms 20 and 21 is such that the bar is caught between the fixed jaw 46 and the pivotal jaw 48 (Figure 8) and held there by spring 49. This position of the arms and roller table is substantially shown by Figure 15. In this respect, the arms may have completed their pivoting on the carriage prior to engaging the bar, particularly where the sides of the roller table do not obstruct the movement of the arms. Upon entering the slots 57 of the bed 56 of the die press, the arms deposit the bar $B_1$ against the block 58 and between the end gauges 59 and 60. Since the heel 119 of the pivotal jaw 48 rests on the bottom of the slots, jaws 46 and 48 are opened as illustrated in Figure 16. Accordingly, when the piston rod 45 of the cylinder 44 is conventionally retracted, the jaws are withdrawn without disturbing the bar.

It sometimes happens that it is desired to place a bar in a die press in an oblique or skewed position with one end higher than the other. This is also possible with our apparatus. By suitably adjusting the cap screws 38, the arms 20 and 21 can be made to pivot differentially when the cylinder 44 acts on bar 39. The loose fit of the lugs 40 and 41 and the bar 39 on the pin 43 freely allows the slight twisting action between the lugs when one arm is pivoted more than the other.

Upon being retracted, the carriage 26 strikes limit switch $S_2$ (Figure 3). This actuates the double-acting cylinder 66 to pivot the plate 63 from the position of Figure 14 to that of Figure 1, whereupon limit switch $S_3$ is tripped. This operates solenoid 117 to release another bar and also actuates cylinder 70. In the meantime, a die 120 of the press punches, shapes, or otherwise deforms the bar $B_1$. As illustrated in Figure 14, the resulting bar $B_2$ may, for example, have three holes punched therein. Actuating cylinder 70 causes the rack 72 to travel outwardly in the guideways 73 thereby rotating pinion 74 and shaft 80 through the described gears 77 and 79 and connecting chain 78. The length of the rack is such that shaft 80 is turned about 360 degrees with the starting and stopping positions being substantially that shown in Figure 2. Accordingly, on the outward travel of rack 72, the arms 22 and 23 travel in a clockwise direction, and since the pins 88 are free to ride the slots 87 and the riders 85 are free to travel in the guide ways 86, the path of travel of the arms is substantially elliptical as shown in Figure 18. In this way, the arms 22 and 23 approach the die bed 56 from a point below the level of the bar, enter the slots 57, thrust the jaws 91 and 95 around the bar, leave on a rising arc, and then reverse their direction of movement to return to their original positions. For this reason, pivotal jaw 91 is placed at the top in arms 22 and 23 in contrast to the pivotal jaw 48 of arms 20 and 21, so that the former is not held open while in the slots of the die bed.

At the end of the forward stroke of the rack 72, a lug 121 thereon strikes limit switch $S_4$ which operates cylinder 66 to cause plate 63 to rotate clockwise to the side delivery station. At this time limit switch $S_5$ is tripped which reverses cylinder 70. This causes arms 22 and 23 again to traverse the elliptical path of Figure 18 but in a counterclockwise direction. Accordingly, the arms 22 and 23 pass over the lever 99 from a point above the holder 101, reverse their direction of movement in a descending arc to place the bar $B_2$ on the holder, and then continue their backward movement, constituting the lower half of the ellipse of Figure 18, so that the parts are finally related as shown in Figure 14. During this motion, the bar $B_2$ is caught by clamp 109 and stripped from the jaws 91 and 95. Retracting the rack 72 causes lug 121 to trip a limit switch $S_6$. This ordinarily would cause cylinder 66 to pivot plate 63 in a counterclockwise direction, but this circuit is kept open by the release of a limit switch $S_7$ below the lever 99 in the following manner. The presence of bar $B_2$ in the holder 101 depresses plate 107 about its hinge and trips a limit switch $S_8$. This actuates microcylinder 113 to clamp bar $B_2$ as shown in Figure 13 and also actuates cylinder 96 to pivot lever 99 to the position shown by the dotted lines 122. This action opens switch $S_7$ which is normally closed by the lowered position of lever 99. The guide walls 114 now direct a hook 115 into one of the punched holes of bar $B_2$. The continued motion of conveyor 116 strips the bar from the clamps 108 and 109 and thereby releases switch $S_8$. The double-acting cylinder 96 now returns the lever 99 to its original position and, in so doing, again closes switch $S_7$. This completes the circuit for actuating cylinder 66, and the plate 63 is once more pivoted to the position of Figure 1. Thereafter, the cycle as described is repeated.

The circuits for operating the air cylinders, including time-delay circuits, are well known in the art, and therefore not illustrated.

While the foregoing disclosure describes a presently preferred embodiment, it is understood that the invention may be practiced in other forms within the scope of the following claims.

We claim:

1. Apparatus for transferring an article to a work station including a carriage adapted for movement toward and away from the work station, arms extending in the direction of movement of the carriage and having a pivot member pivoting the same for rocking motion thereon, means adjacent the forward end of each arm to receive the article, stop means to limit rocking of the arms, a projecting lug on each arm carrying a common pivot member, and means to move the carriage including a lever having spaced portions connected to the pivot member on the carriage and to the pivot member on the lugs for simultaneously fulcruming about and translating with the former cause arm rocking motion by the latter whereby the arms are pivoted and engage the article during said movement of the carriage toward the work station.

2. Apparatus for transferring a workpiece from one station to a second station including a carriage adapted for reciprocable movement past the first station to the second station, a rod fixed to the carriage, arms pivoted on the rod and extending in the direction of travel of the carriage, means adjacent the forward end of each arm to receive the workpiece, stop means to limit pivoting of the arms, lugs projecting downwardly from each arm and mutually carrying a bar, and means to reciprocate the carriage including a lever having spaced portions connected to the rod and to the bar for substantially simultaneously fulcruming about and translating with the rod to rock the bar and the lugs whereby the arms are pivoted about the rod against the stop means and lift the workpiece from the first station during forward movement of the carriage past said station to the second station.

3. Apparatus for transferring an article from one station to a second station including a carriage adaptable for reciprocable movement past the first station to the second station, a rod fixed to the carriage, arms pivoted on the rod and extending in the direction of travel of the carriage, means adjacent the forward end of each arm to receive the article, an adjustable stop for each arm to limit the individual pivoting thereof, lugs projecting downwardly from each arm, a leg also pivoted on said carriage rod, a pin freely extending through the lugs and the leg, and means to reciprocate the carriage engageable only with said leg whereby the arms are pivoted about the rod against the stop means and lift the article from the first station during forward movement of the carriage past said station to the second station and whereby the pin and individual stop means allow the arms to pivot differentially and present the article at the second station in a desired oblique position.

4. Apparatus as claimed in claim 2 wherein the stop means to limit pivoting of the arms includes an adjustable stop for each arm whereby the arms act independently of each other and may pivot differentially to present the workpiece at the second station in a desired oblique position.

5. Apparatus as claimed in claim 2 wherein the stop means to limit pivoting of the arms includes a second rod fixed to the carriage, each arm having a slot to receive the second rod, and an adjustable screw extending through each arm into the slot to vary the opening therein whereby the arms are adapted to act independently of each other and pivot differentially to present the workpiece at the second station in a desired oblique position.

6. Apparatus as claimed in claim 2 wherein said means adjacent the forward end of each arm to receive the workpiece includes a jaw fixed with respect to the arm, a second jaw pivoted to the arm, and resilient means adapted to urge the second jaw toward the first jaw and position the heel of the second jaw below the arm whereby placing the arm on a supporting surface compresses the resilient means and spreads apart said jaws.

7. Apparatus as claimed in claim 2 wherein said second station is a work tool bed having slots to engage the arms in a manner to trip the bar-carrying lugs thereon and release the bar for transfer to said work tool bed.

8. Apparatus as claimed in claim 2 wherein said means adjacent the forward end of each arm to receive the workpiece includes a jaw fixed with respect to the arm, a second jaw pivoted to the arm, and resilient means adapted to urge the second jaw toward the first jaw and position the heel of the second jaw below the arm, and wherein said second station is a work tool bed having slots to receive the arms whereby placing the arms in the slots compresses the resilient means and spreads apart said jaws to release the workpiece on the bed, and means to position the workpiece on the bed.

9. Apparatus for transferring an article including an arm pivotally mounted at a portion intermediate its opposite ends, said mounting being adapted for reciprocable movement, means adjacent one end of the arm to receive the article, pin and slot means connected between the mounting and the arm at its opposite end to limit the pivoting movement of the arm, and means having separate connections to the pivot and to the arm to simultaneously pivot the arm and reciprocate the mounting whereby the article-receiving means traverses substantially an elliptical path to engage and remove the article stationed in said path.

10. Apparatus for transferring an article including a support member having spaced-apart guide ways, an arm pivotally mounted in each guide way and adapted for reciprocable movement therein, means adjacent the other end of each arm for receiving the article, each of said arms having a slot, a crank mounted on the support member transversely of the arms having a pin to engage each slot, and means to reversibly pivot the crank whereby the arms are simultaneously pivoted and moved along the guide ways to traverse the article-receiving means through substantially an elliptical path and whereby pivoting the crank in one direction engages the article-receiving means with the article at a station in said path and pivoting the crank in the reverse direction deposits the article at a station in said path.

11. Apparatus for transferring an article from one station to a second station including a support plate pivoted adjacent one end and adapted for rotation between the stations, guide ways supported by the plate adjacent the other end, an arm pivotally mounted in each guide way, each mounting being adapted for reciprocable movement in the guide way, jaws at the forward end of each arm for gripping the article, each of the arms having a slot, a crank journaled on the support plate having a pin at each end to engage the slots in the arms, and means to reversibly pivot the crank whereby the arms are simultaneously pivoted and reciprocated in the guide ways to traverse the jaws of each arm through substantially an elliptical path and whereby pivoting the crank adjacent the first station in a direction to raise the jaws toward that station engages the jaws with the article to remove it, and pivoting the crank adjacent the second station in the reverse direction deposits the article at said station.

12. Apparatus for advancing and retracting a workpiece with respect to a work station including a carriage adapted for movement toward and away from the work station, arms adapted to receive the workpiece pivoted on the carriage, a lug on each arm, means for moving the carriage engageable with the lugs whereby the arms are pivoted and engage the workpiece during forward movement of the carriage to the work station, second arms pivotally mounted adjacent one end above the first arms, said mountings being adapted for reciprocable movement, means adjacent the other end of each of the second arms to receive the workpiece, and means simultaneously to pivot the second arms and reciprocate the mountings whereby the workpiece-receiving means of the second arms traverses substantially an elliptical path to engage and remove the workpiece stationed in said path.

13. Apparatus for advancing and retracting a workpiece with respect to a work station including a carriage adapted for movement toward and away from the work station, arms extending in the direction of movement of the carriage and pivoted thereon, means adjacent the forward end of each arm to receive the workpiece, stop means to limit pivoting of the arms, a projecting lug on each arm, means to move the carriage engageable only with the lugs whereby the arms are pivoted and engage the workpiece during said movement of the carriage toward the work station, a support member stationed above said arms having spaced-apart guide ways, a second arm pivotally mounted in each guide way and adapted for reciprocable movement therein, means adjacent the other end of each second arm for receiving the workpiece, each of said second arms having a slot, a crank mounted on the support member transversely of the arms having a pin to engage each slot, and means to reversibly pivot the crank whereby the second arms are simultaneously pivoted and moved along the guide ways to traverse the workpiece-receiving means through substantially an elliptical path and whereby pivoting the crank in one direction engages the workpiece-receiving means with the workpiece at a station in said path and pivoting the crank in the reverse direction deposits the article at a station in said path.

14. Apparatus for automatically transferring a workpiece through three stations including a carriage adapted for reciprocable movement past the first station to the second station, a rod fixed to the carriage, arms pivoted on the rod and extending in the direction of travel of the carriage, means adjacent the forward end of each arm to receive the workpiece, stop means to limit pivoting of the arms, lugs projecting downwardly from each arm, and means to reciprocate the carriage engageable only with the lugs whereby the arms and pivoted about the rod against the stop means and lift the workpiece from the first station during forward movement of the carriage past said station to the second station, a support plate stationed above said arms and pivoted adjacent one end, means to rotate the support plate between the second and third stations, guide ways supported by the plate, a second arm pivotally mounted in each guide way, each mounting being adapted for reciprocable movement in the guide way, jaws at the forward end of each of the second arms for gripping the workpiece, each of said arms having a slot, a crank journaled on the support plate having a pin at each end to engage the slots in the second arms, and means to reversibly pivot the crank whereby the second arms are simultaneously pivoted and reciprocated in the guide ways to traverse the jaws thereof through substantially an elliptical path and whereby pivoting the crank adjacent the second station in a direction to raise the jaws of the second arms toward that station engages the jaws with the workpiece to remove it, and pivoting the crank adjacent the third station in the reverse direction deposits the workpiece at said station.

15. Apparatus for transferring an article including a lever, a holder for the article on the lever having a spring cushioned rest capable of limited movement under the weight of the article, fluid pressure, fluid pressure clamp means responsive to the described movement of the rest resulting from deposition of the article in the holder to grip the article, and means to pivot the lever and place the article in a delivery position.

16. Apparatus for transferring an article from a receiving station to a delivery station including a lever normally positioned at the receiving station, a holder for the article adjacent one end of the lever having pneumatic clamps to engage the article and a yieldable rest disposed therebetween and capable of limited movement under the weight of the article, means responsive to the described movement of the yieldable rest resulting from deposition of the article in the holder to operate the clamps, and means to pivot the lever to the delivery station.

17. Apparatus for transferring an article from a receiving station to conveying means including a lever normally positioned at the receiving station, a holder for the article adjacent one end of the lever having a yieldable rest for the articles with switch means thereunder actuated by the deposition of the article in the holder, clamps straddling the rest on the holder and operated by said switch means to engage the article, means also operated by said switch means to pivot the lever from the receiving station to a delivery station, and a conveyor having a path of travel adjacent the delivery station provided with gripping means to engage the article and strip it from the clamps.

References Cited in the file of this patent
UNITED STATES PATENTS

| | | |
|---|---|---|
| 439,925 | Aiken | Nov. 4, 1890 |
| 1,206,252 | Rigney | Nov. 28, 1916 |
| 1,842,912 | McNamara | Jan. 26, 1932 |
| 1,864,322 | Sandler | June 21, 1932 |
| 2,003,364 | Irmscher | June 4, 1935 |
| 2,016,710 | Ferris | Oct. 8, 1935 |
| 2,049,850 | Lytle | Aug. 4, 1936 |
| 2,381,571 | Buchan | Aug. 7, 1945 |
| 2,437,994 | Beyer | Mar. 16, 1948 |